United States Patent Office 2,965,621
Patented Dec. 20, 1960

2,965,621

PROCESS FOR HALOGENATING RUBBERY COPOLYMERS

George E. Serniuk, Roselle, Delmer L. Cottle, Highland Park, and Theodore Lemiszka, Roselle, N.J., assignors to Esso Research and Engineering Company, a corporation of Delaware No Drawing. Filed Jan. 2, 1959, Ser. No. 784,429

9 Claims. (Cl. 260—85.3)

This invention relates to halogenating butyl rubber in the presence of an aqueous solution of an inorganic metal halide salt. Heretofore, butyl rubber has been carefully brominated or chlorinated with gaseous, liquid and solid halogenating agents to contain critically small amounts of combined halogen. Such halogenated isoolefin-multiolefin butyl rubber type copolymers have been found to be vulcanizable with zinc oxide alone and covulcanizable with high unsaturation rubbers such as natural and/or diene-styrene copolymer rubbers.

This in a continuation-in-part of U.S. patent application Serial No. 719,955, filed March 7, 1958 in the names of George E. Serniuk, Delmer L. Cottle, and Theodore Lemiszka.

Whether the solid butyl rubber copolymer is halogenated per se or the copolymer is first dissolved in an inert solvent and then halogenated, some molecular weight breakdown of the copolymer usually occurs. Also, if more than the critically small amounts of halogen above-mentioned are combined with butyl rubber, drastic molecular weight degradation ensues.

It has been previously proposed to alleviate molecular weight degradation by dissolving the butyl rubber in a solvent, adding water thereto, agitating the resulting mixture to form a dispersion of the dissolved butyl rubber in water, and contacting the resulting dispersion with the particular halogenating agent or agents desired. However, such halogenations in the presence of water have been relatively slow which is disadvantageous.

In accordance with the present invention, it has been discovered that the halogenation of butyl rubber in the presence of water may be performed at a rapid rate and without molecular weight degradation if the water contains dissolved therein about 0.0005 to 10, advantageously about 0.001 to 5, and preferably about 0.005 to 1.0 parts by weight of an inorganic metal halide salt per part by weight of water. The amount of water desirably present is about 0.001 to 200 and preferably 1 to 50 parts by weight per 100 parts by weight of butyl rubber, the amount of inorganic metal halide salt dissolved therein corresponding to about 0.0001 to 50 moles, advantageously about 0.01 to 35 moles, and preferably 0.01 to 10 moles per mole of added halogenating agent. The aqueous metal halide salt solution formed may be dispersed with a butyl rubber solution and the halogenating agent per se or in aqueous solution added to the dispersion formed. Alternatively, an aqueous solution of both halogenating agent and metal halide salt may be formed and subsequently contacted with the solution of butyl rubber accompanied by agitation.

Butyl rubber copolymers comprise a major proportion (preferably about 85.0 to 99.5 weight percent) of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably of about 4 to 6 carbon atoms, and are commonly referred to in patents and technical literature as "butyl rubber," or GR–I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, myrene, dimethallyl, allo-ocimene, vinyl fulvenes, etc. The copolymer comprising isobutylene and isoprorene is preferred, although the copolymer may contain about 0.05 to 20.0, preferably about 0.2 to 5.0, parts by weight based on total reacting co-monomers of such mono-olefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 150,000 to 2,000,000 and an Iodine No. between about 0.5 and 50.

In producing halogenated butyl rubber in accordance with the present invention, unmodified, unvulcanized butyl rubber is carefully halogenated in presence of the above-described amounts of an aqueous solution of a metal halide salt until it contains about at least 0.3 weight percent (preferably at least about 1.0 weight percent), but not more than about "X" weight percent of combined fluorine or chlorine or not more than about 3.0 "X" weight percent of combined bromine or iodine wherein:

$$X = \frac{M_3 L}{(100-L)M_1 + L(M_2+M_3)} \times 100$$

and:

L = mole percent of the multiolefin in the polymer
$M_1$ = molecular weight of the isoolefin
$M_2$ = molecular weight of the multiolefin
$M_3$ = atomic weight of the halogen Preferably, there shoud be at least about 0.5 weight percent of combined halogen in the polymer but not more than about 1 atom of fluorine and/or chlorine or 3 atoms of bromine and/or iodine combined in the poymer per molecule of multiolefin present therein; i.e., per each double bond in the polymer.

Suitable halogenating agents which may be employed are gaseous chlorine, liquid bromine, hydrogen fluoride, iodine monochloride, alkali metal hypochlorites or hypobromites, sulfur chlorides or bromides (particularly oxygenated sulfur chlorides or bromides), pyridinium chloride perchloride, N-bromo-succinimide, tri-bromophenol bromide, N-chloroacetamide, N,N'-dimethyl-5,5 dichloro or dibromo hydantoin, and other common halogenating agents.

The halogenation is generally conducted at above 0° C. to below about +150° C., advantageously at about 5° to 65° C., preferably at about 20° to 50° C. (room temperature being satisfactory), depending upon the particular halogenation agent, for about 0.1 minute to several (e.g., 5) days, preferably for about 1 minute to 10 hours and even more especially for about 5 minutes to 5.0 hours. An advantageous pressure range is from about 0.5 to 400 p.s.i.a.; atmospheric pressure being satisfactory. The halogenation conditions are regulated to halogenate the rubbery copolymer to the extent above-mentioned.

According to a preferred embodiment of the present invention, there is prepared a solution of the copolymer as above, in a suitable inert liquid organic solvent such as a $C_3$ to $C_{10}$, or preferably, a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. This solution is then dispersed into an aqueous solution of an inorganic metal halide salt and the resulting dispersion contacted with gaseous chlorine, hydrogen fluoride gas, liquid bromine, iodine monochloride, or other halogenating agent which may be optionally dissolved in an inert solvent and/or dispersed into water.

The concentration of the butyl rubber in the solvent-aqueous medium will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine or hydrogen fluoride gas are employed to halogenate such a rubbery solution, they may also be diluted with 0 to 50 times their volume, preferably about 0.1 to 5.0 times their volume of an inert gas such as nitrogen, methane, ethane, carbon dioxide, etc.

The resulting halogenated butyl rubber polymer may be recovered in various manners. The polymer may be precipitated with acetone, or any other known non-solvent for the butyl rubber, and dried under about 1 to 760 millimeters or higher of mercury pressure absolute at about 0° to 180° C., preferably at about 50 to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, drying and extruding procedures. The halogenated copolymer formed advantageously has a viscosity average molecular weight of about 200,000 to 1,500,000 (i.e., about the same as the unhalogenated copolymer) and a mole percent unsaturation of about 0.5 to 20.0

Suitable inorganic metal halide salts for use in accordance with the present invention comprise groups I to VIII metal halide salts, advantageously groups I, II, III, IV, VI, VII and VIII metal halide salts, preferably groups I, II, VII and VIII metal fluoride, chloride, bromide or iodide salts and even more especially sodium, potassium, calcium, zinc, manganese, iron and cobalt chlorides and/or bromides.

In order to more fully illustrate the present invention, the following experimental data are given:

EXAMPLE 1

*Run 1.*—100 grams of a commercial isobutyl-isoprene butyl rubber copolymer having a Mooney viscosity at 212° F. for 8 minutes of 75, a viscosity average molecular weight of 485,000, an iodine number of 15.4 and a mole percent unsaturation of 2.26 were dissolved in 1,000 ml. of an aluminum chloride treated commercial hexane solvent. The resulting solution was then admixed with 30 grams of diatomaceous earth as filter aid at 40° C. for one hour and then filtered directly into a 2-liter 4-necked flask fitted with a stirrer, reflux condenser, thermometer, and a dropping funnel. The solution formed was stirred at room temperature (24° C.) and 6.46 grams of liquid bromine were added drop by drop over a period of 1 hour. After 3 hours, the room temperature reaction product of butyl and bromine was isolated by washing the solution with water followed by a multiple solution-precipitation using benzene as the solvent and acetone as the anti-solvent three times. Residual solvents were then stripped from the resulting brominated product by heating at 60° C. for 16 hours at 180 millimeters of mercury pressure absolute.

The brominated product was analyzed and found to contain 0.78 weight percent of combined bromine.

*Run 2.*—The same general procedure as in Run 1 was repeated except that the halogenation was carried out with agitation in the presence of 200 ml. of water dispersed with the solution of butyl rubber. The resulting brominated product was found to contain 0.75 weight percent of combined bromine.

*Run 3.*—The same general procedure as in Run 2 was repeated except that, in accordance with the present invention, the water which was dispersed with the butyl rubber prior to bromination contained 10 grams of potassium bromide per 200 ml. of water.

The brominated product produced in accordance with the present invention was then analyzed and found to contain 1.12 weight percent of combined bromine.

The products of Runs 1, 2, and 3 were then compounded as follows:

| Component— | Parts by weight |
|---|---|
| Brominated butyl rubber | 100 |
| MPC carbon black | 50 |
| Stearic acid | 1.0 |
| Zinc oxide | 5.0 |
| Sulfur | 2.0 |
| Tellurium diethyl dithiocarbamate | 1.0 |

All compounded stocks were then vulcanized for 60 minutes at 307° F., the vulcanizate properties being as summarized in the following table:

| Brominated product | 300% Modulus (p.s.i.) | Tensile Strength (p.s.i.) | Elongation, percent |
|---|---|---|---|
| Run 1 | 1,065 | 2,135 | 495 |
| Run 2 | 1,190 | 2,228 | 473 |
| Run 3 (of the invention) | 1,235 | 2,407 | 477 |

The above data show that, when practicing the present invention, a product with a higher halogen content is obtained in the same halogenation time by carrying out the halogenation of dissolved butyl rubber in the presence of an aqueous solution of an inorganic metal halide salt (i.e., potassium bromide). This higher halogen content per unit of time demonstrates that, in accordance with the present invention, the halogenation of butyl rubber in the presence of aqueous solutions of metal halide salts is more rapid than halogenation either in the absence or presence of solely water. The comparable tensile strengths, moduli, and elongations shown for Run 3 of the invention demonstrates that the more rapid halogenation is not accompanied by loss in vulcanizate properties.

Resort may be had to modifications and variations of the disclosed embodiments without departing from the spirit of the invention or the scope of the appended claims.

What is claimed is:

1. A process for halogenating an isoolefin-multiolefin butyl rubber copolymer which comprises dissolving the copolymer in an inert hydrocarbon solvent, admixing therewith a minor proportion based on copolymer solvent solution of an aqueous solution of a metal halide salt selected from the group consisting of groups I, II, and VII metal halides, stirring the resulting admixture to form a suspension of dissolved copolymer particles in said aqueous solution and halogenating the copolymer particles while thus suspended in said aqueous solution so as to give a halogenated copolymer containing at least 0.5 weight percent combined halogen but no more than three atoms of halogen per double bond in the copolymer.

2. A process according to claim 1 in which the amount of water present is between about 1.0 and 50 parts by weight of water per 100 parts by weight of the isoolefin-multiolefin copolymer.

3. A process according to claim 1 in which the halogenation reaction is at above about 0° C. to below about 150° C. for between about 5 minutes and 5 hours.

4. A process according to claim 1 in which the halogen is fluorine.

5. A process according to claim 1 in which the halogen is chlorine.

6. A process according to claim 1 in which the halogen is bromine.

7. A process according to claim 1 in which the halogen is iodine.

8. A process according to claim 1 in which the metal halide salt is a group I metal halide.

9. A process according to claim 1 in which the metal halide salt is an alkaline earth metal halide.

References Cited in the file of this patent

UNITED STATES PATENTS

| | | |
|---|---|---|
| 2,631,984 | Crawford | Mar. 17, 1953 |
| 2,681,899 | Crawford | June 22, 1954 |
| 2,695,899 | Becker | Nov. 30, 1954 |
| 2,698,041 | Morrissey | Dec. 28, 1954 |
| 2,720,479 | Crawford | Oct. 11, 1955 |
| 2,732,354 | Morrissey | Jan. 4, 1956 |
| 2,748,105 | Becker | May 29, 1956 |
| 2,804,448 | Hallenbeck | Aug. 27, 1957 |
| 2,809,372 | Frederick | Oct. 8, 1957 |
| 2,816,098 | Morrissey | Dec. 10, 1957 |
| 2,833,734 | Morrissey | May 6, 1958 |

FOREIGN PATENTS

| | | |
|---|---|---|
| 476,269 | Great Britain | Dec. 6, 1937 |